US009130670B2

United States Patent
Jobert et al.

(10) Patent No.: US 9,130,670 B2
(45) Date of Patent: Sep. 8, 2015

(54) TECHNIQUE FOR DETERMINING A PROPAGATION DELAY OF AN OPTICAL SIGNAL BETWEEN TWO OPTICAL DEVICES VIA AN OPTICAL LINK

(75) Inventors: Sebastien Jobert, Begard (FR); Esther Le Rouzic, Trébeurden (FR); Nicolas Brochier, Ploumagoar (FR)

(73) Assignee: France Telecom, Paris (FR)

( * ) Notice: Subject to any disclaimer, the term of this patent is extended or adjusted under 35 U.S.C. 154(b) by 136 days.

(21) Appl. No.: 13/878,062

(22) PCT Filed: Oct. 3, 2011

(86) PCT No.: PCT/FR2011/052294
§ 371 (c)(1),
(2), (4) Date: Jul. 16, 2013

(87) PCT Pub. No.: WO2012/045962
PCT Pub. Date: Apr. 12, 2012

(65) Prior Publication Data
US 2013/0322872 A1 Dec. 5, 2013

(30) Foreign Application Priority Data
Oct. 5, 2010 (FR) ...................................... 10 58057

(51) Int. Cl.
*H04B 10/07* (2013.01)
*H04B 10/073* (2013.01)
*H04J 3/06* (2006.01)

(52) U.S. Cl.
CPC .............. *H04B 10/07* (2013.01); *H04B 10/073* (2013.01); *H04J 3/0682* (2013.01)

(58) Field of Classification Search
CPC ...................................................... H04B 10/07
USPC ............................................................ 398/25
See application file for complete search history.

(56) References Cited

U.S. PATENT DOCUMENTS 5,673,133 A * 9/1997 Imaoka et al. ................ 398/202
5,790,294 A * 8/1998 Horiuchi et al. ................ 398/37
(Continued)

FOREIGN PATENT DOCUMENTS

EP 1610476 A1 12/2005

OTHER PUBLICATIONS

Gavin P. Agrawal, "Nonlinear Fiber Optics", Third Edition, Optics and Photonics (formerly Quantum Electronics), Academic Press, 2001.
International Search Report and Written Opinion dated Nov. 30, 2011 for corresponding International Application No. PCT/FR2011/052294, filed Oct. 3, 2011.
(Continued)

*Primary Examiner* — David Payne
*Assistant Examiner* — Omar S Ismail
(74) *Attorney, Agent, or Firm* — David D. Brush; Westman, Champlin & Koehler, P.A.

(57) ABSTRACT

A method and apparatus for measuring a propagation delay of an optical signal between first and second devices in an optical transmission network, the optical signal being transmitted from the first device to the second device via a first optical fiber and from the second device to the first device via a second optical fiber. The second device includes a loopback having a first mode enabling the optical signal to be routed between the two devices. The method includes: detecting by the second device a triggering by the first device of a propagation delay measurement; receiving a measurement signal transmitted by the first device via the first optical fiber; and configuring the loopback in a second mode in which the loopback injects a return signal into the first fiber in response to the measurement signal. The first device implements a method for determining the propagation delay.

13 Claims, 3 Drawing Sheets

(56) References Cited

U.S. PATENT DOCUMENTS 6,563,613 B1* 5/2003 Tochio .............................. 398/25
7,945,160 B2* 5/2011 Hinderthur ..................... 398/33
2009/0060498 A1* 3/2009 Libeskind et al. ............. 398/28

OTHER PUBLICATIONS

International Preliminary Report on Patentability and English Translation of the Written Opinion dated Apr. 9, 2013 for corresponding International Patent Application No. PCT/FR2011/052294 filed Oct. 3, 2011, 9 pages.

* cited by examiner

TECHNIQUE FOR DETERMINING A PROPAGATION DELAY OF AN OPTICAL SIGNAL BETWEEN TWO OPTICAL DEVICES VIA AN OPTICAL LINK

CROSS-REFERENCE TO RELATED APPLICATIONS

This application is a Section 371 National Stage Application of International Application No. PCT/FR2011/052294, filed Oct. 3, 2011, which is incorporated by reference in its entirety and published as WO 2012/045962 on Apr. 12, 2012, not in English.

STATEMENT REGARDING FEDERALLY SPONSORED RESEARCH OR DEVELOPMENT

None.

THE NAMES OF PARTIES TO A JOINT RESEARCH AGREEMENT

None.

FIELD OF THE DISCLOSURE

The invention lies in the field of optical transmission systems, and more particularly in the field of determining a propagation delay of an optical signal on an optical link between two optical devices.

BACKGROUND OF THE DISCLOSURE

For measuring a propagation delay of an optical signal between two optical devices connected by two separate links, one for each transmission direction, a method is known for measuring a forward and return propagation delay. A measurement signal is sent by an optical device initiating the measurement to the neighboring optical device via the first optical link. The latter responds to the measurement signal to the initiating optical device via the second optical link.

The Precision Time Protocol (PTP), as specified in the standard IEEE 1588-2008, enables a communication network to synchronize clocks between devices. Several mechanisms are possible in this standard. One of them comprises a mechanism for calculating optical delay, called 'Peer Delay Link Measurement'. In this mechanism, an initiating device sends a 'Peer_Delay_Request' message to a remote device via a first optical link. The latter responds using a response message 'Peer_Delay_Response' optionally accompanied by another response message 'Peer_Delay_Response_Follow_Up', one of these two response messages including in particular a measurement of an internal electronic processing delay to the remote device. This internal processing delay may vary, for example, according to the load factor of the remote device. This or these response messages are routed via a second optical link, separate from the first optical link. This method therefore enables the internal processing delay in the remote device to be precisely obtained for a given measurement.

A forward and return propagation delay is then obtained by taking away the internal processing delay as it was received from the remote device, from the delay measured by the initiating device. The propagation delay in one direction is then estimated by dividing the forward and return propagation delay into two equal parts. However, this method does not take into account an asymmetry of the optical links connecting the initiating and remote devices.

Thus, in an optical transmission network, when the respective lengths of the links of the two directions are not identical, the value of the estimated propagation delay is affected by an error that is hard to quantify.

In some cases, when there is a difference in length of the links, e.g. optical fibers, the asymmetry can be significant. In other cases, although the difference in length of the fibers in itself is quite small, particularly when they belong to the same cable, asymmetry may arise from the distribution of fibers on the devices themselves or from repairs or splices made during the service life of the cable.

Many applications require a knowledge of this propagation delay of an optical signal from one device to another. Methods of resource reservation or methods of synchronization of optical devices may be cited by way of example.

For these different applications, the precision required for measuring a propagation delay of an optical signal is of the order of a few nanoseconds. It cannot be obtained using existing techniques, in particular due to the error affecting the measurement, especially in the case of asymmetric links.

SUMMARY

According to a first aspect, the invention relates to a method for measuring a propagation delay of an optical signal between two devices in an optical transmission network, the optical signal being transmitted from the first device to the second device via a first optical fiber and from the second device to the first device via a second optical fiber, separate from the first optical fiber, the second device including 'loopback' means, capable in a first mode of enabling the optical signal to be routed between the two devices, said measurement method including the following steps implemented by the second device:

a detection step, during which a triggering of a measurement of the propagation delay of a measurement signal is detected, the measurement signal being transmitted by the first device via the first optical fiber;

a step for configuring the loopback means to a second mode, said second mode enabling a return signal to the measurement signal transmitted by the first device to be injected into the first optical fiber.

In the first mode, the loopback means direct an optical signal received on the first optical fiber to receiving means of the second device.

The return signal may correspond to the measurement signal in an embodiment in which the loopback is optical. In an embodiment in which the loopback includes electronic processing, the return signal may correspond to a signal generated by the second device.

The measurement signal may be a light pulse, or a given packet or a given frame.

The loopback means thus enable the return signal to be injected into the optical fiber via which the measurement signal has been received.

Correspondingly, according to a second aspect, the invention relates to a method for determining a propagation delay of an optical signal between two devices in an optical transmission network, the optical signal being transmitted from the first device to the second device via a first optical fiber and from the second device to the first device via a second optical fiber, separate from the first optical fiber, the second device implementing the measurement method according to the first aspect, said determination method including the following steps implemented by the first device:

a step of triggering a measurement of the propagation delay of a measurement signal via the first fiber, the measurement signal being transmitted to the second device via the first optical fiber;

a step of receiving a return signal transmitted by the second device on the first optical fiber;

a step of determining said propagation delay from an instant of the measurement signal being transmitted and an instant of the return signal being received.

The first device, receiving the return signal on the optical fiber via which it transmitted the measurement signal, can determine the propagation delay without being disturbed by an asymmetry between the two optical fibers.

The determined propagation delay is then reliable and enables the desired precision to be achieved, i.e. of the order of a few nanoseconds.

It is pointed out here that methods based on the principle of optical fiber backscattering, such as OTDR (Optical Time-Domain Reflectometry) do not provide a satisfactory measurement, particularly in the case of optical fibers of significant length. Indeed, in such a case, the power of the light received by backscattering may then be too low and become lost in line noise before the end of the backscattering. It is not possible to determine the end of the backscattering effect and hence to determine the propagation delay. It should be noted that this type of measurement is generally used for locating fiber cutting points or for measuring the length of the fiber. It is also difficult to apply to a measurement signal carried by a given wavelength for a multiplexed wavelength signal, due to the considerable power needed for this type of measurement, which would impact on the other wavelengths.

The determined propagation delay can be used in the implementation of resource reservation methods in circuit switched or burst switched (OBS—Optical Burst Switching) optical transmission networks.

The loopback means may be formed solely of optical components. In this embodiment, the return signal is injected into the first optical fiber without any particular processing of the second device. The propagation delay thus obtained is of very high precision.

According to a particular feature of the measurement method, the detection step consists of a step of receiving a request for measuring the propagation delay, said request being transmitted by the first device.

The first device transmits a measurement request to the second device. The reception of this request at the second device triggers the measurement phase. In a particular embodiment, the configuration step is implemented following reception of the measurement request and before reception of the measurement signal.

According to another particular feature, the measurement method includes a step of determining a processing delay at the second device, the processing delay being transmitted in return to the first device.

Correspondingly, according to a particular feature, the determination method further includes a step of receiving the processing delay at the second device, the second device implementing the measurement method as previously described, and in which the step of determining the propagation delay also takes into account said processing delay.

In this embodiment, electronic processing is performed in the second device. Since the second device supplies the first device with the duration of the internal electronic processing, this can be used to correct the forward and return propagation delay measured by the first device and thus to obtain a propagation delay not taking into account the internal processing delay. The propagation delay thus determined is not affected by errors related to asymmetry.

In a particular embodiment, during this electronic processing, the loopback means are configured to the second operating mode.

In another particular embodiment, the loopback means are configured to the second operating mode before reception of the measurement signal. In this case, the triggering of the measurement phase is detected by the reception of a measurement request originating from the first device.

According to another particular feature of the measurement method, the detection step consists of a step of receiving the measurement signal originating from the first device.

The triggering of the measurement phase is detected by the reception of the measurement signal. In this case, the configuration step is implemented immediately following this detection.

According to a third aspect, the invention relates to a method for determining an asymmetry between two optical fibers connecting two devices in an optical transmission network, an optical signal being transmitted from the first device to the second device via a first optical fiber and from the second device to the first device via a second optical fiber, separate from the first optical fiber, in which:

the first, respectively the second, device implements a method for determining a first, respectively a second, propagation delay of an optical signal via the first, respectively the second, optical fiber according to the second aspect by cooperating with the second, respectively the first, device implementing the measurement method according to the first aspect;

said method including the following steps implemented by the first device:

a step of receiving the second propagation delay determined by the second device and, a step of determining asymmetry from the first and second propagation delays.

The determined asymmetry can be used for the implementation of synchronization between remote devices. Indeed, knowledge of the asymmetry between two optical fibers connecting two devices can be used to correct the transfer of a synchronization reference. This enables the quality of the synchronization in the optical transmission network to be improved. Certain upgrades in mobile networks, such as LTE (Long Term Evolution), require such quality.

According to a fourth aspect, the invention relates to a first device of an optical transmission network, connected to a second device, an optical signal being transmitted from said second device to said first device via a first optical fiber and from said first device to said second device via a second optical fiber, separate from the first optical fiber, said first device including:

loopback means, arranged for, in a first mode, directing an optical signal received on the first optical fiber to receiving means of the first device and, in a second mode, injecting into the first optical fiber a signal transmitted in return to a measurement signal transmitted by said second device;

means for detecting a triggering of a measurement of the propagation delay of a measurement signal, the measurement signal being transmitted by said second device via the first fiber;

control means, arranged for configuring the loopback means to the second mode following said detection.

According to a particular feature, the first device further includes:

means for receiving the measurement signal;

processing means, arranged for processing the measurement signal for obtaining the return signal and for determining a processing delay by the first device;

means for transmitting the processing delay.

According to a fifth aspect, the invention relates to a second device of an optical transmission network, initiating the measurement, connected to a first device, arranged according to the fourth aspect, an optical signal being transmitted from said second device to said first device via a first optical fiber and from said first device to said second device via a second optical fiber, separate from the first optical fiber, said second device including:

means for triggering a measurement of the propagation delay of a measurement signal, the measurement signal being transmitted by said second device via the first fiber to said first device;

means for receiving a return signal transmitted by said first device;

means for determining said propagation delay from an instant of the measurement signal being transmitted and an instant of the return signal being received.

According to a particular feature, the second device, initiating the measurement, further includes means for switching the return signal received on the first fiber to the optical signal receiving means on the second fiber, said receiving means on the second fiber thereby forming the means for receiving the return signal.

According to another particular feature, the second device, initiating the measurement, further includes:

means for switching between a first position, in which an optical signal is transmitted from said second device to said first device via a first optical fiber and from said first device to said second device via a second optical fiber, separate from the first optical fiber, and a second position, in which an optical signal is transmitted from said second device to said first device via the second optical fiber and from said first device to said second device via the first optical fiber;

control means, arranged for controlling the switching of the switching means to the second position;

means for receiving a processing delay determined by said first device; said determining means also taking into account the processing delay received for determining the propagation delay.

According to a sixth aspect, the invention relates to a system for measuring a propagation delay of an optical signal in an optical transmission network including a first device according to the fourth aspect and a second device according to the fifth aspect.

The first and second devices may be arranged for measuring and taking into account an internal electronic processing delay, as previously described.

According to a seventh aspect, the invention also relates to a computer program comprising instructions for implementing the method for measuring a propagation delay according to the first aspect, implemented by an optical transmission network device, when this program is executed by a processor.

According to an eighth aspect, the invention also relates to a computer program comprising instructions for implementing the method for determining a propagation delay according to the second aspect, implemented by an optical transmission network device, when this program is executed by a processor.

BRIEF DESCRIPTION OF THE DRAWINGS

The invention will be better understood from the following description of particular embodiments of the methods of the invention, with reference to the accompanying drawings in which.

DETAILED DESCRIPTION OF ILLUSTRATIVE EMBODIMENTS

FIGS. 1a, 1b, 2, 3a, 3b depict a system 1 for measuring the propagation delay of an optical signal in an optical transmission network. This system 1 includes two optical devices N1, N2 according to particular embodiments of the invention. An optical signal is transmitted from the first device N1 to the second device N2 via a first optical fiber FO1. Another optical signal is transmitted from the second device N2 to the first device N1 via a second optical fiber FO2. This second optical fiber FO2 is separate from the first optical fiber FO1. Next, this particular case of two separate optical fibers is addressed.

The first embodiment and its variants are based on an entirely optical loopback. The second embodiment as well as its variant are based, in their turn, on an optical loopback cooperating with electronic processing.

For all of these embodiments, the second optical device N2 includes loopback means. The loopback means are formed of optical components. The loopback means are arranged:

in a first operating mode, for routing an optical signal between the two devices, i.e. directing an optical signal received on the first optical fiber FO1 to receiving means of the second device, and, in a second operating mode, for injecting a signal transmitted in return to a measurement signal transmitted by the first device, into the first optical fiber FO1.

The first operating mode thus corresponds to a nominal operating mode, in which the two devices exchange optical signals via two optical fibers, one for each communication direction.

For determining a propagation delay of an optical signal, the first device N1 transmits a measurement signal to the second device N2 on the first optical fiber FO1 and receives, thanks to the loopback means, a return signal transmitted by the second device on the first optical fiber. Since the return signal follows the same optical fiber as the measurement signal, it is then possible to determine the propagation delay on this optical fiber from the measurement of a duration between the instant of transmission of the measurement signal and the instant of reception of the return signal. The propagation delay thus determined is not affected by an error linked to the asymmetry of the optical fibers.

The measurement signal and the signal transmitted in return are defined later in relation to the embodiments of the invention.

Obviously the description is set within the context of determining a propagation delay of an optical signal from the first device N1 to the second device N2. Thus, for determining the propagation delay of an optical signal from the second device N2 to the first device N1, the means of the second device N2 must also be provided in the first device N1 and vice versa.

The next focus of attention is the first particular case of an optical loopback, corresponding to the first embodiment.

In this first case, the return signal transmitted by the second device N2 corresponds to the measurement signal transmitted by the first device N1, attenuated where applicable.

The measurement signal transmitted may, for example, consist of a light pulse, or a clock signal sent for a predetermined duration, or a particular modulation of a light signal, or yet again a predetermined frame or packet.

In this first case, the propagation delay on the first optical fiber FO1 is determined in theory in a quasi-accurate way, since no electronic processing is performed on the measurement signal within the second device N2.

Figure 1A:
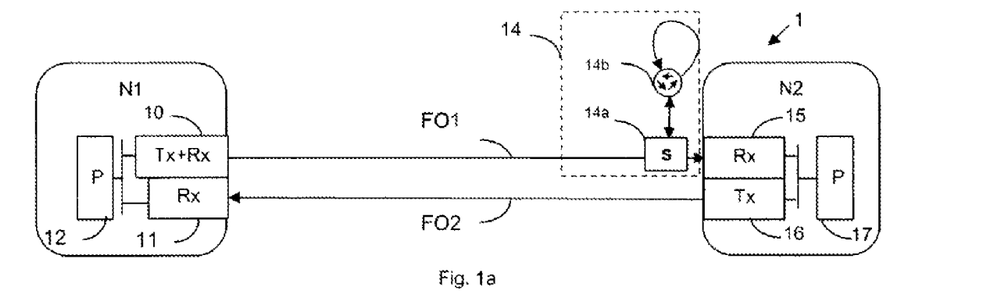
FIG. 1a depicts two optical devices according to a first variant of a first particular embodiment of the invention.

FIG. 1a depicts the two optical devices N1, N2 according to a first variant of the first embodiment.

The first device N1 includes:
a transmitting and receiving module 10, associated with the first optical fiber FO1, arranged for transmitting and receiving an optical signal via the first optical fiber FO1;
a receiving module 11, associated with the second optical fiber FO2, arranged for receiving an optical signal via the second optical fiber FO2;
a processing module 12.

The second device N2 includes:
a receiving module 15, associated with the first optical fiber FO1, arranged for receiving an optical signal via the first optical fiber FO1;
a transmitting module 16, associated with the second optical fiber FO2, arranged for transmitting an optical signal via the second optical fiber FO2;
a processing module 17.

The second device N2 further includes loopback means 14, as previously defined. In this first embodiment, the loopback means 14 are formed of an optical switch 14a and a circulator 14b. The circulator 14b is used to avoid interference problems in the loop.

In a first position the optical switch 14a is used to direct an optical signal received from the first device N1 on the first optical fiber FO1 to the receiving module 15 of the second device N2 outside of the measurement periods of the propagation delay of the first optical fiber FO1. In a second position, the optical switch 14a transmits the optical signal received from the first device N1 to the circulator 14b, which transfers the signal into a loop and then transmits it to the optical switch 14a. Thus, in this second position of the switch 14a, the loopback means 14 can be used to reinject the optical signal received, and once the latter is reinjected it becomes the return signal during the measurement periods of the propagation delay of the first optical fiber FO1.

It is pointed out here that the loopback means 14 contribute hardly any uncertainty to the measurement, since the loopback takes place over a loop length of the order of a few centimeters. The first optical fiber FO1, the object of measurement, may have, in its turn, a length of the order of several tens of kilometers to be measured.

The optical switch 14a is a 1×2, or 2×1 optical switch, of the opto-mechanical type, for example. A switch may be chosen, for example, in which the switching speed is of the order of a few milliseconds.

Figure 1B:
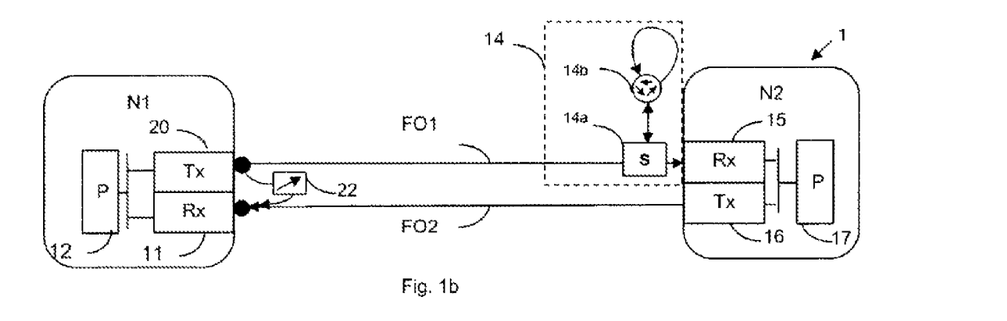
FIG. 1b depicts two optical devices according to a second variant of the first particular embodiment of the invention.

FIG. 1b depicts a second variant of the first embodiment, in which only the first device N1 is modified.

The first device N1 includes the receiving module 11 and the processing module 12 previously described. It further includes a transmitting module 20, associated with the first optical fiber FO1, arranged for transmitting an optical signal via the first optical fiber FO1. The first device N1 further includes a variable attenuator 22 which can be used in a first position for a nominal operating mode and in a second position for redirecting an optical signal received via the first optical fiber FO1 to the receiving module 11. As a reminder, the latter is associated with the second optical fiber FO2. This second variant dispenses with the receiving part of the module 10 previously described in relation to FIG. 1a.

Optionally, for these two variants, the loopback means 14 also include an amplifier, not shown in FIGS. 1a and 1b, in the circulator loop. This ensures that the optical signal is reinjected at the appropriate power for being detected by the first device N1 and thus a transmitting and receiving module 10 can be used for the first variant or a receiving module 11 for the second variant, with the conventional receiving sensitivity of an in-line system, of the order of −24 dBm, for example.

Figure 2:
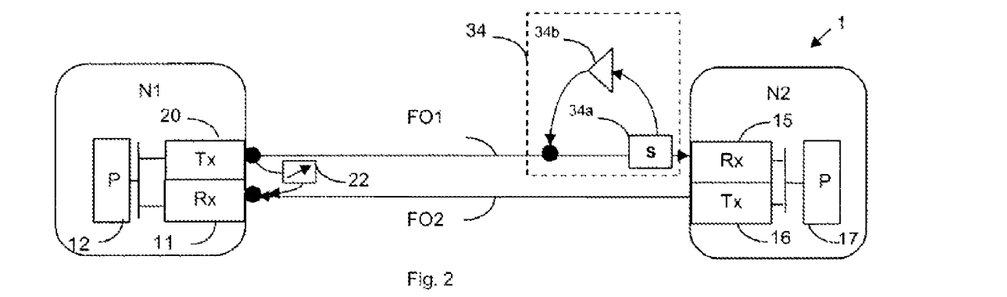
FIG. 2 depicts two optical devices according to a third variant of the first particular embodiment of the invention.

FIG. 2 depicts the two devices N1 and N2 in a third variant of the first embodiment. The first device N1 corresponds to that described in relation to FIG. 1b. The second device N2 corresponds to that described in relation to FIGS. 1a and 1b, except for the loopback means.

The second device N2 includes loopback means 34. These loopback means 34 are formed of an optical switch 34a, an amplifier 34b and a coupler. The coupler is placed on the first optical fiber FO1 for receiving the optical signals originating from the first device N1 and transmitting them to the optical switch 34a and for injecting an optical signal received from the amplifier 34b into the first optical fiber FO1. The amplifier 34b also acts as an isolator. In a first position of the optical switch 34a, an optical signal received on the first optical fiber FO1 via the coupler is transmitted to the receiving module 15 of the second device N2. In a second position of the optical switch 34a, an optical signal received on the first optical fiber FO1 via the coupler is transmitted to the amplifier 34b. The amplifier 34b amplifies the optical signal and transmits it to the coupler which injects it into the first optical fiber FO1 destined for the first device N1, and once injected this becomes the return signal during measurement periods of the propagation delay.

For these three variants of the first embodiment, the functions of the processing modules 12 and 17 of the first and second devices are described later in relation to FIG. 4.

Figure 4:
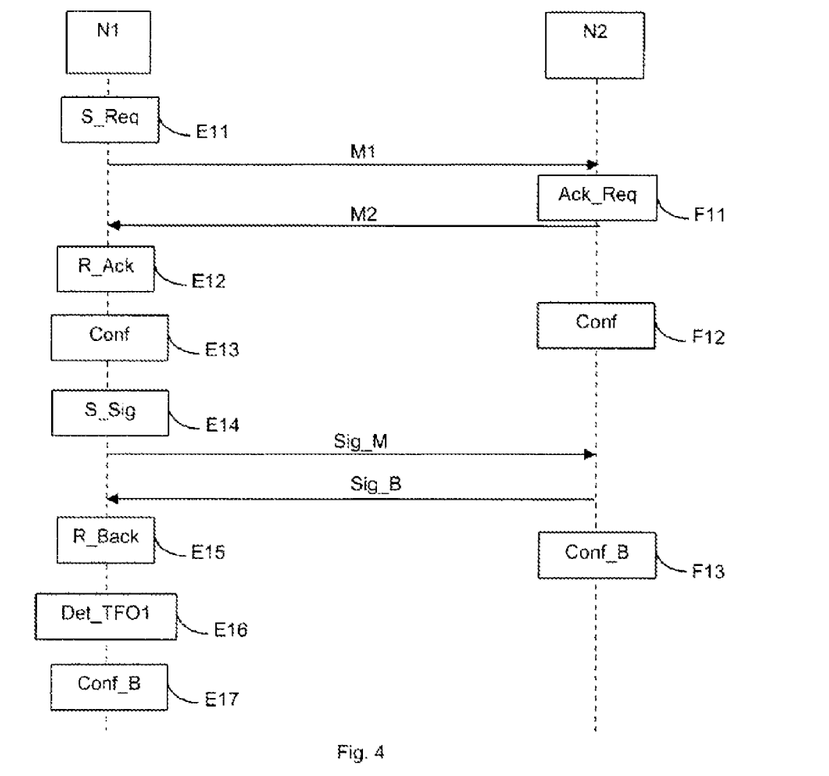
FIG. 4 depicts the steps of the measurement and determination methods according to the first particular embodiment of the invention.

FIG. 4 depicts the steps of the methods for measuring and determining a propagation delay of an optical signal between two devices in an optical transmission network according to the first embodiment. Generally, the measurement method consists in implementing a loopback in the second device.

The method for measuring a propagation delay is implemented by the second device N2 and the method for determining a propagation delay is implemented by the first device N1 for obtaining a propagation delay of an optical signal via the first optical fiber FO1 between the two devices N1, N2.

The loopback means 14, 34 are initially positioned in the first operating mode.

In a step E11 of the determination method, the first device N1 transmits a request M1 for measuring a propagation delay of a measurement signal via the first fiber FO1 destined for the second device N2. More precisely, the processing module 12 requests the transmission of the measurement request to the transmission module 10 or 20. Optionally, the first device N1 triggers a time delay for supervising the reception of an acknowledgment originating from the second device N2. If at the expiration of this time delay, no acknowledgment message is received, the first device N1 reinitializes the sending of the measurement request. The measurement phase begins for the first device N1 with the transmission of the measurement request.

This measurement request is received by the second device N2 in a step F11 of the measurement method, via the receiving module 15. The second device N2 thus detects with the reception of the measurement request that the first device N1 has triggered a measurement. The measurement phase begins for the second device N2 with the reception of the measurement request.

The second device N2 then transmits, still in this step F11, a signal M2 in acknowledgment of the measurement request. More precisely, the processing module 17 requests the transmitting module 16 to transmit the acknowledgment signal. As a reminder, the acknowledgment signal is routed via the optical fiber FO2.

In a step F12, the processing module 17 of the second device M2 then configures the loopback means 14, 34 to the second operating mode, as previously described and in which a return signal is injected into the first optical fiber FO1 in response to a measurement signal transmitted by the first device N1. When the measurement signal follows a link or a channel used for routing traffic, the second device N2 notifies the devices to which it is connected that the link or the channel is out of service and unavailable for the duration of the measurement.

The acknowledgment signal M2 is received by the first device N1 in a step E12 of the determination method. More precisely, the acknowledgment signal is received by the receiving module 10 or 11 and transmitted to the processing module 12.

If necessary, particularly when the first device N1 includes the variable attenuator 22, the processing module 12 configures the necessary means for receiving the response signal in a step E13 of the determination method. When the measurement signal follows a link or a channel used for routing traffic, the first device N1 notifies the devices to which it is connected that the link or the channel is out of service and unavailable for the duration of the measurement.

In a step E14 of the determination method, the first device N1 transmits the measurement signal Sig_M via the first optical fiber FO1 destined for the second device N2. More precisely, the processing module 12 requests the transmitting module 10 or 20 to transmit the measurement signal Sig_M and stores the instant of transmission $t_e$ in memory. Optionally, the processing module 12 triggers a time delay for supervising the reception of the return signal originating from the second device N2.

The measurement signal is then processed optically by loopback means 14, 34.

The loopback means 14, 34 are used to inject a return signal Sig_B into the first optical fiber FO1. Since this first embodiment of the loopback means 14, 34 is optical, the measurement signal is not processed electronically at the second device N2.

In a step E15 of the determination method, the return signal is received at the first device N1 via receiving modules 11 or 10 and transmitted to the processing module 12. The instant of reception $t_r$ is also stored in memory.

It is pointed out here that the processing module 12 may cooperate with an electronic hardware aid, e.g. a programmable logic circuit of the FPGA (Field-Programmable Gate Array) type, for precisely determining the instants of transmission and reception.

In a step E16 of the determination method, the processing module 12 determines the propagation delay of the measurement signal $t_{FO1}$ from the instants of transmission of the measurement signal and reception of the return signal:

$$t_{FO1}=(t_r-t_e)/2$$

In a step F13 of the measurement method, the processing module 17 of the second device configures the loopback means 14, 34 in the first operating mode and if necessary, notifies the devices to which it is connected of the return to service of the link or the channel used for the measurement. The measurement is finished for the second device N2.

In a step E17 of the determination method, the processing module 12 of the first device configures, where appropriate, the variable attenuator 22 in its nominal operating position and, if necessary, notifies the devices to which it is connected of the return to service of the link or the channel used for the measurement. The measurement is finished for the first device N1.

The next focus of attention is the second particular case of electronic processing contributing to the loopback, corresponding to the second embodiment.

In this second case, the measurement signal may consist of a light pulse, or a clock signal sent for a predetermined duration, or a particular modulation of the light signal, or yet again a frame or a packet that can easily be identified by the second device N2 such as a propagation delay measurement frame or packet. The return signal may consist of a frame or a packet indicating to the first device N1 the electronic processing delay at the second device N2. It may also be identical to the measurement signal if the electronic processing delay is transmitted by other means to the first device N1.

Figure 3A:
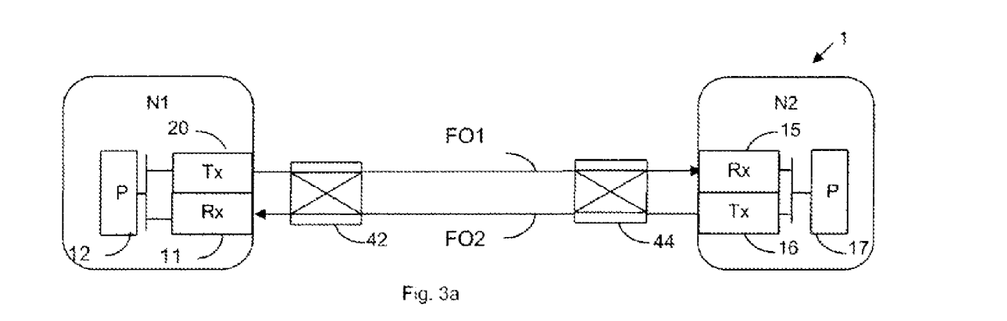
FIG. 3a depicts two optical devices according to a first variant of a second particular embodiment of the invention.

FIG. 3a depicts the two optical devices N1, N2 according to a first variant of the second embodiment.

The first device N1 includes:
a transmitting module 20, arranged for transmitting an optical signal;
a receiving module 11, arranged for receiving an optical signal;
a processing module 12.

The first device N1 further includes an optical switch 42. In a first operating mode, corresponding to a first position, or 'parallel position', the optical switch 42 is used to direct an optical signal transmitted by the transmitting module 20 from the first device N1 to the second device N2 on the first optical fiber FO1 and an optical signal received from the second device N2 on the second optical fiber FO2 to the receiving module 11 of the first device N1. In a second operating mode, corresponding to a second position, or 'crossed position', the optical switch 42 is used to direct an optical signal transmitted by the transmitting module 20 from the first device N1 to the second device N2 on the second optical fiber FO2 and an optical signal received from the second device N2 on the first optical fiber FO1 to the receiving module 11 of the first device N1.

The second device N2 includes:
a receiving module 15, arranged for receiving an optical signal;
a transmitting module 16, arranged for transmitting an optical signal;
a processing module 17.

The second device N2 further includes an optical switch 44. In a first operating mode, corresponding to a first position, or 'parallel position', the optical switch 44 is used to direct an optical signal received on the first optical fiber FO1 to the receiving module 15 of the second device N2 and an optical signal received from the transmitting module 16 of the second device N2 to the first device N1 on the second optical fiber FO2. In a second operating mode, corresponding to a second position, or 'crossed position', the optical switch 44 transmits an optical signal received on the second optical fiber FO2 to the receiving module 15 of the second device N2 and transmits an optical signal received from the transmitting module 16 of the second device N2 to the first device N1 via the first optical fiber FO1.

The optical switches 42 and 44 are 2×2 optical switches, of the opto-mechanical type, for example.

The functions of the processing modules 12 and 17 of the first and second devices are specified later in relation to FIG. 5. However, it is pointed out here that the processing module 17 is particularly arranged for receiving a measurement signal received from the receiving module 15 and transmitting a return signal to the transmitting module 16. Thus, for this first variant, the processing module 17 cooperates with the optical switch 44 for injecting the return signal on the first optical fiber FO1.

Figure 5:
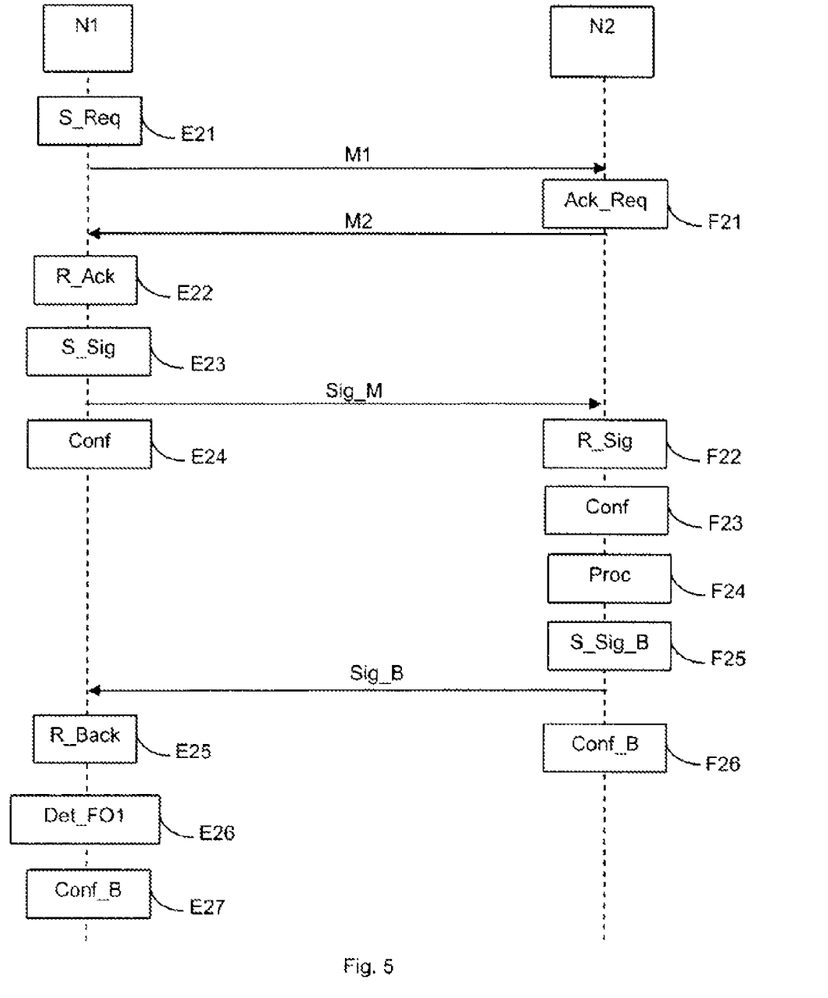
FIG. 5 depicts the steps of the measurement and determination methods according to the first variant of the second particular embodiment of the invention.

FIG. 5 depicts the steps of the methods for measuring and determining a propagation delay of an optical signal between two devices in an optical transmission network according to the first variant of the second embodiment.

The method for measuring a propagation delay is implemented by the second device N2 and the method for determining a propagation delay is implemented by the first device N1 for obtaining a propagation delay of an optical signal via the first optical fiber FO1 between the two devices N1, N2.

The optical switches 42, 44 are initially positioned in the first operating mode (parallel positions).

In a step E21 of the determination method, the first device N1 transmits a request M1 for measuring the propagation delay of a measurement signal via the first fiber FO1 destined for the second device N2. More precisely, the processing module 12 requests the transmission of a measurement request to the transmission module 20. Optionally, the first device N1 triggers a time delay for supervising the reception of an acknowledgment originating from the second device N2. If at the expiration of this time delay, no acknowledgment message is received, the first device N1 reinitializes the sending of the measurement request. The measurement phase begins for the first device N1 with the transmission of the measurement request.

This measurement request is received by the second device N2 in a step F21 of the measurement method, via the receiving module 15. The second device N2 thus detects with the reception of the measurement request that the first device N1 has triggered a measurement. The measurement phase begins for the second device N2 with the reception of the measurement request.

The second device then transmits, still in this step F21, a signal M2 in acknowledgment of the measurement request. More precisely, the processing module 17 requests the transmitting module 16 to transmit the acknowledgment signal. As a reminder, the acknowledgment signal is routed via the optical fiber FO2. When the measurement signal follows a link or a channel used for routing traffic, the second device N2 notifies the devices to which it is connected that the link or the channel is out of service and unavailable during the measurement period.

The acknowledgment signal M2 is received by the first device N1 in a step E22 of the determination method. More precisely, the acknowledgment signal is received by the receiving module 11 and transmitted to the processing module 12. When the measurement signal follows a link or a channel used for routing traffic, the first device N1 notifies the devices to which it is connected that the link or the channel is out of service and unavailable during the measurement period.

In a step E23 of the determination method, the first device N1 transmits the measurement signal Sig_M via the first optical fiber FO1. More precisely, the processing module 12 requests the transmitting module 20 to transmit the measurement signal Sig_M and stores the instant of transmission $t_e$ in memory. Optionally, the processing module 12 triggers a time delay for supervising the reception of the return signal originating from the second device N2.

In a step E24 of the determination method, the processing module 12 configures the necessary means for receiving the return signal. More precisely, the processing module 12 configures the loopback means 42 in the second operating mode (crossed position) immediately after the transmission of the measurement signal. If at the expiration of the time delay triggered at step E23, no return signal is received, the first device N1 reconfigures the loopback means 42 in the first operating mode (parallel position).

In a step F22 of the measurement method, the second device N2, more precisely the processing module 17, receives the measurement signal Sig_M via the receiving module 15. The processing module 17 stores the instant of reception of the measurement signal Sig_M in memory for determining the electronic processing delay.

In a step F23 of the measurement method, the processing module 17 of the second device M2 then configures the optical switch 44 to the second operating mode (crossed position), as previously described, upon receiving the measurement signal. The optical switch 44 is then configured for injecting into the first optical fiber FO1 a return signal Sig_B in response to the measurement signal transmitted by the first device N1.

During this configuration step F23, the processing module 17 determines in a step F24 an internal processing delay at the second device N2. The internal processing time is determined with an electronic hardware aid, such as an FPGA programmable logic circuit. This internal processing delay $t_{int}$ takes into account the time needed for configuring the optical switch 44.

In a step F25, the processing module 17 requests the transmitting module 16 to transmit the return signal Sig_B, which includes the internal processing delay $t_{int}$ determined at step F24. Optionally, the internal processing delay is transmitted in a subsequent second response message.

In a step E25 of the determination method, the return signal Sig_B is received at the first device N1 via the receiving module 11 and transmitted to the processing module 12. The instant of reception $t_r$ is also stored in memory.

It is pointed out here that the processing module 12 may cooperate with an electronic hardware aid, e.g. an FPGA programmable logic circuit, for precisely determining the instants of transmission and reception.

In a step E26 of the determination method, the processing module 12 determines the propagation delay $t_{FO1}$ of the measurement signal from the instants of transmission of the measurement signal, receiving the return signal and the internal processing delay received at the second device N2:

$$t_{FO1}=(t_r-t_e-t_{int})/2$$

In a step F26 of the measurement method, the processing module 17 of the second device configures the optical switch 44 in the first operating mode (parallel position) and if necessary, notifies the devices to which it is connected of the return to service of the link or the channel used for the measurement. The measurement is finished for the second device N2. In a step E27 of the measurement method, the processing module 12 of the first device configures the optical switch 42 in the first operating mode (parallel position) and if necessary, notifies the devices to which it is connected of the return to service of the link or the channel used for the measurement. The measurement is finished for the first device N1.

It is pointed out here that preferentially the optical switch 44 should be selected in such a way that the change in position of the optical switch 44 at step F23 can be achieved in a fairly short time, less than one millisecond, so that the electronic processing delay at the second device N2 is not too long. Indeed, otherwise, and if the clock frequency of the second device N2 is not sufficiently precise, an error may affect the measurement of the processing time. The technical features of some optical switches meet this constraint. The constraints on the first optical switch 42 are, on the other hand, less significant when the measurement of a propagation delay in the first optical fiber FO1 is in progress. However, as this optical switch 42 is also used for measuring a propagation delay on the second optical fiber FO2, the same constraint applies.

The second embodiment may advantageously be implemented using the messages defined by the PTP protocol. The PTP message 'Peer_Delay_Request' is then the measurement signal transmitted by the first device N1 and the PTP message 'Peer_Delay_Response' the return signal. In the case where the internal processing delay is transmitted independently of the return signal, it is possible to use the PTP message 'Peer_Delay_Response_Follow_up'. These signals used for measurement are responsible for carrying the time stamps necessary for indicating the electronic processing delay to the first device N1.

In other words, the 'Peer Delay Link Measurement' mechanism provided in the PTP standard for supplying an internal processing delay, this mechanism being used for measuring a forward and return propagation delay via two links, e.g. separate optical fibers, is used for implementing the methods as previously described on one and the same optical fiber.

Figure 3B:
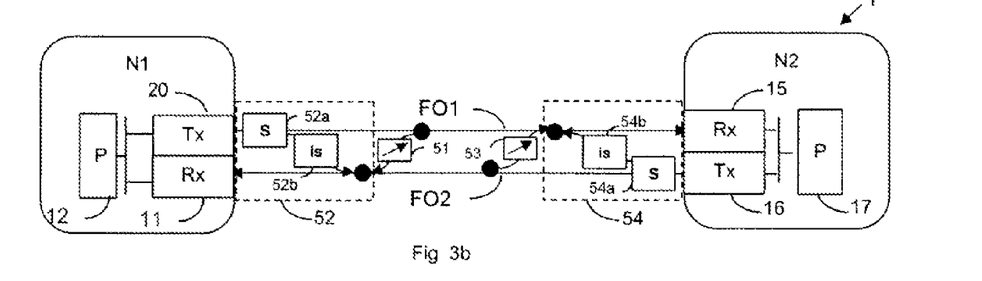
FIG. 3b depicts two optical devices according to a second variant of the second particular embodiment of the invention.

FIG. 3b depicts the two optical devices N1, N2 according to a second variant of the second embodiment.

Instead of the optical switch 42, the first device N1 includes loopback means 52 including an optical switch 52a, an isolator 52b and a coupler. The optical switch 52a enables the transmitting module 20 to transmit to the second fiber FO2 during the measurement period. The isolator 52b prevents the measurement signal in the forward direction from being received by the transmitting module 20 during the measurement period. A second isolator, not shown in FIG. 3b, may also be added at the output of the optical switch 52a on the first optical fiber FO1 for protecting the transmitting module 20 during the measurement period.

A variable attenuator 51 is placed between the first and second optical fibers and ensures that outside the measurement periods, the backscattered signal from the first fiber FO1 does not disturb the receiving module 11 of the first device N1.

In an equivalent way, instead of the optical switch 44, the second device N2 includes loopback means 54 including an optical switch 54a, an isolator 54b and a coupler.

The optical switch 54a enables the transmitting module 16 to transmit to the first fiber FO1 during the measurement period. The isolator 54b prevents the measurement signal in the forward direction from being received by the transmitting module 16 during the measurement period. A second isolator, not shown in FIG. 3b, may also be added at the output of the optical switch 54a on the second optical fiber FO2 for protecting the transmitting module 16 during the measurement period.

A variable attenuator 53 is placed between the first and second optical fibers and ensures that outside the measurement periods, the return signal sent by the transmitting module 16 does not disturb the receiving module 11 of the first device N1.

In operation, when a measurement of a propagation delay on the first optical fiber FO1 is triggered by the first device N1, the attenuator 51 of the first device N1 opens the optical connection between the first optical fiber FO1 and the receiving module 11 of the first device N1 and the optical switch 54a of the second device N2 is positioned so that the transmitting module 16 of the second device 2 transmits to the first optical fiber FO1. During the measurement on the first optical fiber FO1, the attenuator 53 of the second device N2 remains in the closed position, and the optical switch of the first device N1 in the normal position, connected to the first optical fiber FO1.

Configuration step E24 of the determination method is thus implemented from the end of step E22 and prior to the transmission (E23) of the measurement signal for this second variant. Configuration step F23 of the measurement method is thus implemented from the end of step F21 and prior to the reception (F22) of the measurement signal for this second variant.

At step E23, the transmitting module 20 of the first device N1 sends the measurement signal to the second device N2. This measurement signal is received by the receiving module 15 of the second device N2 at step F22, and processed electronically with a variable delay, but which is measured precisely by the second device N2 at step F24.

At step F25, the transmitting module 16 of the second device N2 sends the return signal back to the first device N1 on the first optical fiber FO1, indicating the measurement of the processing delay via the optical switch 54a of the second device N2 previously positioned for transmitting to the first optical fiber FO1 and the optical coupler. This return signal is received, at step E25, by the receiving module 11 of the first device N1, via the attenuator of the first device N1 at present open and the optical couplers. At step E26, by analyzing this return signal, the first device N1 obtains the electronic processing delay at the second device N2, and can thus determine at step E26 the propagation delay on the first optical fiber FO1.

It is pointed out here that the description of the embodiments has been given for particular embodiments in which the control signals, i.e. the measurement request and the corresponding acknowledgment, follow the same path as the optical signals. No limitation is attached to these particular embodiments, the control signals being able to follow different paths from the measurement optical signals.

These embodiments are also compatible with implementations in which a centralized manager interfaces between the two devices for routing control signals.

For both embodiments described, measuring the propagation delay can be carried out multiple times, in order to determine an averaged propagation delay. This reduces uncertainties regarding the measurement as well the effects of temperature variations.

Due to the order of magnitude of the delays measured, generally of the order of a few milliseconds, any inaccuracy of the measurement due to an inaccurate clock is negligible, so long as the oscillator implemented in the device is of sufficient quality. This also applies in the case where the device initiating the measurement is not correctly synchronized in frequency. For example, an oscillator with a drift of one ppm accumulates a nanosecond of error over a millisecond. It is pointed out here that it is possible to use much better oscillators, e.g. with a drift of one ppb. The best results are obtained when the first device initiating the measurement is synchronized in frequency, so as to minimize this measurement inaccuracy. Similarly, it is preferable to synchronize the second device in frequency in order to obtain an accurate measurement of the internal electronic processing delay.

Figure 6:
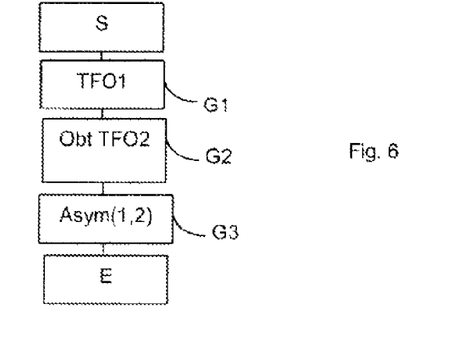
FIG. 6 depicts the steps of the method for determining an asymmetry according to a particular embodiment of the invention.

The methods for determining and measuring a propagation delay, as previously described, find a particularly advantageous application for determining an asymmetry of two optical fibers, described in relation to FIG. 6.

In a step G1 of the method for determining an asymmetry, the first device N1 determines a first propagation delay $t_{FO1}$ of an optical signal via the first optical fiber FO1 by the implementation of the method for determining a propagation delay as previously described by cooperating with the second device N2, which implements the measurement method previously described and transmits this first propagation delay to the second device N2. The second device N2 determines a second propagation delay $t_{FO2}$ of an optical signal via the second optical fiber FO2 by the implementation of the method for determining a propagation delay as previously described by cooperating with the first device N1, which implements the measurement method previously described and transmits this second propagation delay to the first device N1. The first device N1 receives the second propagation delay in a step G2 of the method for determining an asymmetry.

In a step G3 of the method for determining an asymmetry, the first device N1 determines an asymmetry between the two optical fibers. The first device N1 can thus correct PTP messages subsequently received to compensate for this asymmetry, as described in section 11.6 of the standard IEEE 1588-2008.

The various FIGS. 1*a*, 1*b*, 2, 3*a*, 3*b* illustrate particular cases where the optical signal is carried by a single wavelength. The embodiments are easily transposable to cases where the optical fibers each carry a WDM ('Wavelength Division Multiplexing' in English) optical signal, composed of a plurality of signals of different wavelengths. For this type of optical signal, the loopback means previously described are placed before the WDM multiplexer at the first device N1 and after the WDM demultiplexer at the second device N2. It thus reduces to the case of a single wavelength.

The measurement signal may be carried by a channel used for routing user traffic outside the measurement period. It may, for example, involve a non-WDM optical link carrying the traffic, or in the case of a WDM system, with a wavelength also used for carrying the traffic. In this case, the measurement cannot be performed when the traffic is carried on the channel, since the transmission of the return signal on the first optical fiber interferes with the transmission of the user traffic on the first and second fibers. It is therefore necessary to block the user traffic on this channel during the propagation delay measurement.

In the case of WDM, the operation of other wavelengths is not disrupted.

It is pointed out here that blocking traffic during measurement has only very low impact since this measurement is of short duration.

In addition, measurements are only necessary at the start-up of the link or after a loss of the link. This can also be supplemented with a regular measurement, e.g. weekly. Indeed, the length of the fibers varies little and slowly, e.g. according to the changes in soil temperature over the seasons for a buried fiber.

A transmission channel dedicated to measurement may also be used. For example, a dedicated wavelength may be used for carrying the measurement signal. The selected wavelength should pass through all the elements that contribute to the propagation delay. In this case, it is not necessary to block traffic during the measurement of the propagation delay.

It may be noted that for this particular case of embodiment (use of a transmission channel dedicated to measurement), and particularly in the first variant of the second embodiment, the exchange of measurement request M1 and acknowledgment M2 messages may advantageously be replaced by detection by the second device N2 at step F22 of reception of the measurement signal originating from the first device N1. This is made possible due to the configuration step F23 being subsequent to the reception (F22) of the measurement signal Sig_M. The second device N2 thus detects with the reception of the measurement signal that the first device N1 has triggered a measurement. The measurement phase begins for the second device N2 with the reception of the measurement signal.

It is pointed out here that when the propagation delay measurement is performed on a dedicated wavelength, it is possible to deduce the propagation delay on the other useful wavelengths carrying user data. However, due to chromatic dispersion, the delays on the various wavelengths are not exactly the same. According to the distance of the link, this difference may be more or less significant. For example, there may be up to 40 nanoseconds of uncertainty over 80 kilometers of uncompensated link due to chromatic dispersion for 30 nanometers of wavelength difference. This difference may reach 80 nanometers between the C and L bands. In this case, it can be seen that the difference is not negligible compared with the objectives of accuracy.

In order to correct this error due to chromatic dispersion, it is possible to automatically compensate by calculating the difference in propagation delay measurement between the wavelength used for the measurement and each useful wavelength from knowing each wavelength and the distance of the link, which is known quite accurately thanks to the propagation delay measurement. Several models are possible for performing this calculation (see, for example, Govind P. Agrawal, 'Nonlinear Fiber Optics', Academic Press, 1989). It is important, however, that the dispersion values per wavelength are stored in memory in the devices.

In addition, when the propagation delay measurement is performed on a dedicated wavelength, it is possible to use different wavelengths in the forward and return direction. This case may be considered as a case where the signals are different in the forward and return directions. It is appropriate in this case to take into account and compensate for the effects of chromatic dispersion.

The processing module 12 of the first device N1 is arranged for implementing the steps of the previously described method for determining a propagation delay that are executed by the device. Preferably this involves software modules including software instructions for executing the steps of the previously described method for determining a propagation delay, implemented by an optical device. The invention therefore also relates to:

a device program, including program instructions intended for controlling the execution of the steps of the previously described method for determining a propagation delay that are executed by said device, when said program is executed by a processor thereof;

a recording medium readable by a device on which the device program is recorded.

The processing module 17 of the second device N2 is arranged for implementing the steps of the previously described measurement method that are executed by the device. Preferably this involves software modules including software instructions for executing the steps of the previously described measurement method, implemented by an optical device. The invention therefore also relates to:

a device program, including program instructions intended for controlling the execution of the steps of the previously described measurement method that are executed by said device, when said program is executed by a processor thereof;

a recording medium readable by a device on which the device program is recorded.

The processing module 12, 17 of device N1, N2 is arranged for implementing the steps of the previously described method for determining an asymmetry that are executed by the device. Preferably this involves software modules including software instructions for executing the steps of the previously described method for determining an asymmetry, implemented by an optical device. The invention therefore also relates to:

a device program, including program instructions intended for controlling the execution of the steps of the previously described method for determining an asymmetry that are executed by said device, when said program is executed by a processor thereof;

a recording medium readable by a device on which the device program is recorded.

The software modules may be stored in or transmitted by a data medium. This may be a hardware storage medium (e.g. a CD-ROM, a magnetic disk or a hard disk) or a transmission medium (such as an electrical, optical or radio signal, or a telecommunication network).

Although the present disclosure has been described with reference to one or more examples, workers skilled in the art will recognize that changes may be made in form and detail without departing from the scope of the disclosure and/or the appended claims.

The invention claimed is:

1. A method for measuring a propagation delay of an optical signal between first and second devices in an optical transmission network, the optical signal being transmitted from the first device to the second device via a first optical fiber and from the second device to the first device via a second optical fiber, separate from the first optical fiber, the second device including a switchable optical loopback component, capable in a first mode of directing an optical signal received on the first optical fiber to a receiving module of the second device, said measurement method including the following steps implemented by the second device:
 a detection step by the second device, during which a triggering of a measurement of the propagation delay of a measurement signal is detected, the measurement signal being transmitted by the first device via the first optical fiber; and
 following said detection of the triggering of a measurement of the propagation delay of a measurement signal, a step of switching the switchable optical loopback component from the first mode to a second mode wherein the switchable optical loopback component enables a return optical signal to the measurement signal transmitted by the first device to be injected into the first optical fiber.

2. The method as claimed in claim 1, in which the detection step comprises receiving a request for measuring the propagation delay, said request being transmitted by the first device.

3. The method as claimed in claim 1, including determining a processing delay at the second device, the processing delay being transmitted in return to the first device.

4. The method as claimed in claim 3, in which the detection step comprises receiving the measurement signal originating from the first device.

5. The method of claim 1, further comprising:
 the first device triggering the measurement of the propagation delay of a measurement signal via the first fiber by transmitting the measurement signal to the second device via the first optical fiber;
 receiving the return signal transmitted by the second device on the first optical fiber;
 determining said propagation delay from an instant of the measurement signal being transmitted and an instant of the return signal being received.

6. The method as claimed in claim 5, further including determining a processing delay at the second device, the processing delay being transmitted in return to the first device, and wherein the step of determining the propagation delay also takes into account said processing delay.

7. The method as claimed in claim 5, further comprising determining an asymmetry between the first and second optical fibers connecting first and second devices, in which:
 the first, respectively the second, device implements a method for determining a first, respectively a second, propagation delay of an optical signal via the first, respectively the second, optical fiber as claimed in claim 5 by cooperating with the second, respectively the first, device implementing the measurement method claim 1;
 said method including the following acts implemented by the first device:
 receiving the second propagation delay determined by the second device and,
 determining asymmetry from the first and second propagation delays.

8. An apparatus comprising a first device of an optical transmission network, an optical signal being received from a second device by said first device via a first optical fiber and transmitted from said first device to said second device via a second optical fiber, separate from the first optical fiber, said first device including:
 a switchable optical loopback component arranged to switch between a first mode and a second mode, wherein the switchable optical loopback component is arranged in the first mode to direct an optical signal received on the first optical fiber to a receiving module of the first device and wherein the switchable optical loopback component is arranged in the second mode to inject into the first optical fiber an optical signal transmitted in return to a measurement signal transmitted by said second device;
 means for detecting a triggering of a measurement of the propagation delay of a measurement signal, the measurement signal being transmitted by said second device via the first fiber;
 control means, arranged for switching the switchable optical loopback component from the first mode to the second mode following said detection of the triggering of a measurement of the propagation delay of a measurement signal.

9. The apparatus of claim 8, wherein the first device further includes:
- means for receiving the measurement signal;
- processing means, arranged for processing the measurement signal for obtaining the return signal and for determining a processing delay by the first device;
- means for transmitting the processing delay.

10. The apparatus of claim 8, further comprising the second device, said second device including:
- means for triggering the measurement of the propagation delay of the measurement signal, the measurement signal being transmitted by said second device via the first fiber to said first device;
- means for receiving the return signal transmitted by said first device;
- means for determining said propagation delay from an instant of the measurement signal being transmitted and an instant of the return signal being received.

11. The apparatus as claimed in claim 10, further including means for switching the return signal received on the first fiber to the optical signal receiving means on the second fiber, said receiving means on the second fiber thereby forming the means for receiving the return signal.

12. The apparatus as claimed in claim 10, said second device further including:
- means for switching between a first position, in which a first optical signal is transmitted from said second device to said first device via the first optical fiber and from said first device to said second device via the second optical fiber, separate from the first optical fiber, and a second position, in which a second optical signal is transmitted from said second device to said first device via the second optical fiber and from said first device to said second device via the first optical fiber;
- control means, arranged for controlling the switching of the switching means to the second position;
- means for receiving a processing delay determined by said second device;
- said determining means also taking into account the processing delay received for determining the propagation delay.

13. A Non-transitory hardware storage medium comprising a computer program stored thereon and comprising instructions for implementing a method for measuring a propagation delay of an optical signal between first and second devices in an optical transmission network, implemented by the second device, when this program is executed by a processor, wherein the optical signal is transmitted from the first device to the second device via a first optical fiber and from the second device to the first device via a second optical fiber, separate from the first optical fiber, the second device including a switchable optical loopback component, capable in a first mode of directing an optical signal received on the first optical fiber to a receiving module of the second device, said method including the following steps implemented by the second device:
- a detection step by the second device, during which a triggering of a measurement of the propagation delay of a measurement signal is detected, the measurement signal being transmitted by the first device via the first optical fiber; and
- following said detection of the triggering of a measurement of the propagation delay of a measurement signal, a step of switching the switchable optical loopback from a first mode to a second mode wherein the switchable optical loopback component, enables an optical return signal to the measurement signal transmitted by the first device to be injected into the first optical fiber.

\* \* \* \* \*